DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 27, 1973

916 O.G. 1211

T916,002

COATING COMPOSITIONS

Matthew B. Launikitis, Parc-One, Apt. B–30, Lindenwold, N.J. 08021, and Clifford D. Marshall, 115 Rockingham Road, Cherry Hill, N.J. 08034

Filed Nov. 6, 1972, Ser. No. 304,163

Int. Cl. C08g *45/08, 45/10*

U.S. Cl. 260—831

No Drawing. 12 Pages Specification

Curable can coating compositions and their preparation are described. More particularly, amino-converted epoxy coatings which are especially suitable for coating aluminum beverage cans comprise (a) a polyglycidyl ether of a polyhydric phenol of molecular weight of from about 900 to about 4,500; (b) a converting resin selected from the group consisting of alkylated amino resins and phenolic resins wherein each of the resins contain alkylated methylol groups, (e.g., urea-formaldehyde resins); and (c) a catalytic amount of a compound of the formula

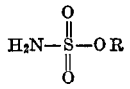

wherein R is hydrogen, ammonium or substituted ammonium which when heated above 200° F., decomposes into an acid and a volatile amine containing moiety (e.g., sulfuric acid, ammonium sulfanate, and pyridine sulfamate). A very desirable weight ratio of polyglycidyl ether to converting resin is from about 95:5 to about 30:70, and these curable coating compositions may be diluted with conventional diluents such as oxygenated hydrocarbons (ketones, ethers, esters, etc.) to facilitate handling.